United States Patent
Mailliet et al.

(10) Patent No.: US 6,922,597 B2
(45) Date of Patent: Jul. 26, 2005

(54) METHOD FOR CONTROLLING THE OPERATION OF A SYSTEM, SUB-SYSTEM OR COMPONENT

(75) Inventors: Herve Mailliet, Pontpierre (LU); Julien Quilliard, Metz (FR); Jean-Jacques Dulin, Margut (FR)

(73) Assignee: Delphi Technologies, Inc., Troy, MI (US)

(*) Notice: Subject to any disclaimer, the term of this patent is extended or adjusted under 35 U.S.C. 154(b) by 387 days.

(21) Appl. No.: 10/216,417

(22) Filed: Aug. 9, 2002

(65) Prior Publication Data

US 2003/0060901 A1 Mar. 27, 2003

(30) Foreign Application Priority Data

Sep. 25, 2001 (LU) ................................. 90 840

(51) Int. Cl.⁷ ............................................ G05B 9/02
(52) U.S. Cl. ......................... 700/79; 700/32; 700/52; 700/175; 702/34; 702/84; 702/176; 702/184
(58) Field of Search ............................ 700/21, 28, 32, 700/37, 52, 54, 71, 79, 81, 175; 702/32, 84, 176, 177, 182–185, 34

(56) References Cited

U.S. PATENT DOCUMENTS

| | | | |
|---|---|---|---|
| 3,950,985 A | | 4/1976 | Buchwald et al. ............. 73/116 |
| 4,397,124 A | * | 8/1983 | Redman .................... 52/126.4 |
| 4,733,361 A | | 3/1988 | Krieser et al. ............... 364/508 |
| 4,908,775 A | * | 3/1990 | Palusamy et al. .............. 702/34 |
| 5,036,698 A | * | 8/1991 | Conti .............................. 73/38 |
| 5,311,562 A | | 5/1994 | Palusamy et al. ............ 376/215 |
| 5,447,059 A | | 9/1995 | Miller et al. .................. 73/116 |
| 5,653,144 A | * | 8/1997 | Fenelon ........................ 74/411 |
| 5,654,500 A | * | 8/1997 | Herron et al. ................ 73/116 |
| 5,659,468 A | * | 8/1997 | Duss ............................ 700/32 |
| 6,408,258 B1 | * | 6/2002 | Richer ........................ 702/182 |
| 6,433,513 B1 | * | 8/2002 | Hayashi ...................... 320/132 |
| 6,490,543 B1 | * | 12/2002 | Jaw ............................ 702/184 |
| 6,600,565 B1 | * | 7/2003 | Suresh et al. ............... 356/521 |
| 2002/0140965 A1 | * | 10/2002 | Cheney | |

FOREIGN PATENT DOCUMENTS

| | | | |
|---|---|---|---|
| EP | 0509817 | 10/1992 | ......... G05B/19/405 |
| EP | 0833548 | 4/1998 | ........... H05B/41/16 |

* cited by examiner

*Primary Examiner*—Anthony Knight
*Assistant Examiner*—Crystal J Barnes
(74) *Attorney, Agent, or Firm*—Patrick M. Griffin

(57) ABSTRACT

In order to improve the reliability of a system, sub-system or component, a method for controlling the operation of a system, sub-system or component, comprises the steps of
a) repeatedly recording an operation time of said system, sub-system or component and at least one further parameter relevant to system, sub-system or component aging
b) evaluating a usage profile based on said recorded operation time and said at least one further parameter, said usage profile being indicative of the accumulated stress at the time of the evaluation, and
c) if a difference between said evaluated usage profile and a nominal usage value at the time of the evaluation exceeds a predetermined threshold value, adjusting an operation parameter of said system, sub-system or component.

6 Claims, 1 Drawing Sheet

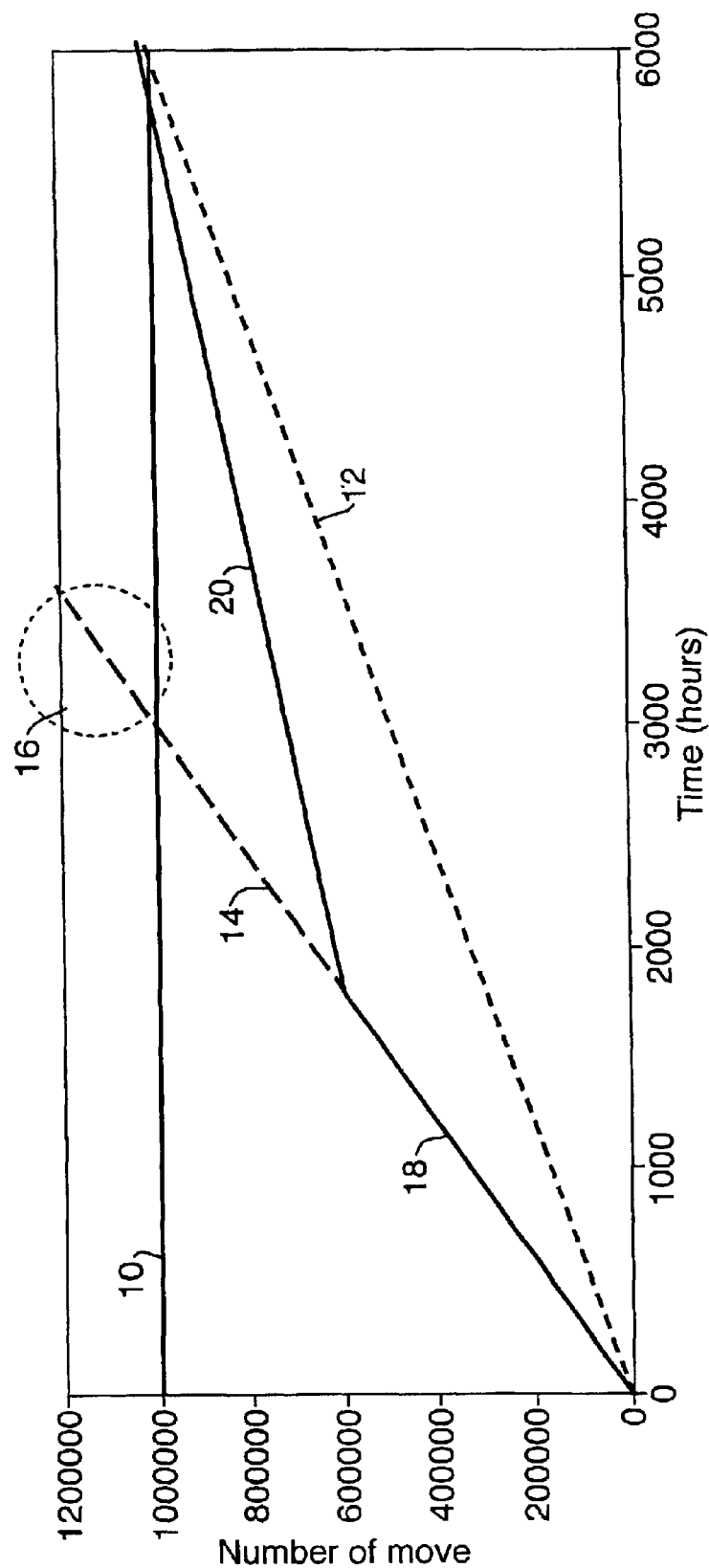

METHOD FOR CONTROLLING THE OPERATION OF A SYSTEM, SUB-SYSTEM OR COMPONENT

TECHNICAL FIELD

The present invention generally relates to a method for controlling the operation of a system, sub-system or component of an appliance, a machine or an engine. More specifically, the present invention relates to the control of such a system, sub-system or component in order to improve its durability.

BACKGROUND OF THE INVENTION

An appliance, a machine or an engine generally consists of different components, which can be regrouped in systems and sub-subsystems. A sub-system is a set of components placed in series and/or in parallel. A system is a set of sub-systems and components placed in series and/or in parallel.

The different systems, sub-systems and components of an appliance, a machine or an engine are designed and dimensioned in order to reach a predetermined service life. This nominal service life can e.g. correspond to the service life of the appliance or machine or to a predetermined maintenance interval of the machine or engine. In order to reach the nominal service life, the system, sub-system or component must be designed in order to be able to withstand the accumulated stress to which it is subject during the nominal service life under nominal operation conditions. Nominal operating conditions can include e.g. a nominal applied load, nominal ambient conditions, etc.

However, the actual operating conditions of the appliance often considerably differ from the nominal operating conditions. In the case of actual operating conditions, which are more severe than the nominal conditions, the system, sub-system or component is subject to an increased stress compared to the nominal stress. This increased stress accelerates the aging of the system, sub-system or component and thus leads to premature failing of the system, sub-system or component and accordingly to increased maintenance costs for the appliance, machine or engine.

In order to avoid premature failing of the system, sub-system or component, the system, sub-system or component has to be designed in order to withstand the stress of worst case operating conditions. Such a design increases of course the manufacturing costs of the system, sub-system or component. This means on the other hand that for normal operating conditions, i.e. for operating conditions, which will occur most of the time, the system, sub-system or component will be oversized or over-dimensioned.

SUMMARY OF THE INVENTION

The object of the present invention is to provide a method for controlling the operation of a system, sub-system or component, which improves the reliability of the system, sub-system or component.

In order to overcome the above-mentioned problems, the present invention proposes a method for controlling the operation of a system, sub-system or component, which comprises the steps of
a) repeatedly recording an operation time of said system, sub-system or component and at least one further parameter relevant to system, sub-system or component aging
b) evaluating a usage profile based on said recorded operation time and said at least one further parameter, said usage profile being indicative of the accumulated stress at the time of the evaluation, and
c) if a difference between said evaluated usage profile and a nominal usage value at the time of the evaluation exceeds a predetermined threshold value, adjusting at least one operation parameter of said system, sub-system or component.

In contrast to the actual situation, where the design determines the lifetime of a system, sub-system or component, the present invention allows to increase the lifetime of a system, sub-system or component by adapting one or more operation parameters of the system, sub-system or component. The operation parameters are preferably adapted in order to reduce the stress, to which the system, sub-system or component is subject. Such stress reduction is a simple and low-cost way to increase service life. It may e.g. be achieved by reducing the performance of said system, sub-system or component and/or by reducing the operation frequency or working time of said system, sub-system or component and/or by reducing its speed. The method thus proposes to reduce the overall performance of the appliance, machine or engine for the benefit of increased service life. The proposed method thus takes into account that on aged vehicles, appliances, machines etc. reliability is considered to be more valuable then maximum performance.

It should be noted that in the current situation, the systems, sub-systems or components are designed for an estimated usage profile. This estimated usage profile is purely theoretical and based on a nominal utilization of the system, sub-system or component. Since such estimation is rather inaccurate, the design must meet the estimated usage profile multiplied by a certain safety factor. It follows that the actual design of the system, sub-system or component may be rather inadequate for the actual usage profile. In contrast to use an estimated usage profile, the present invention proposes to "measure" the actual usage profile and to control the performance of the system, sub-system or component accordingly. The evaluation of the actual usage profile allows a better understanding real life operating conditions for the different systems, sub-systems or components, and accordingly allows to adapt the design to such real life operating conditions. This means that the design of the system, sub-system or component may be closer adapted to the real life operating conditions, i.e. the safety factor may be reduced. This results of course in reduced manufacturing costs for the different systems, sub-systems or components.

The method proposes to repeatedly record the operation time as well as at least one further parameter relevant to the system, sub-system or component. This further parameter may be a load value, a load alternation, a rotational speed, an ambient temperature or humidity, etc. It will be appreciated that some or all of these parameters are commonly recorded in order to monitor the operation of the system, sub-system or component. In such a case, the present method uses parameter values that are already present in the system and/or other specific sensor means available on the market.

Based on the above explanations, it will be appreciated, that the present invention is applicable to all systems, sub-systems or components, which are controllable by an adjustment of operation parameters and which provide a feedback of their operating conditions in the form of one or more parameters relevant to aging of the system, sub-system or component. The systems, sub-systems or components may be electrical systems, sub-systems or components such as electrical motors or the like or to a certain extend mechanical systems, sub-systems or components, e.g. a mechanical compressor, wherein the operation parameters of an actuator may be amended. Just like the range of systems, sub-systems or components, the range of application of the control method is very wide. In fact the method can as well be used to increase the lifetime of home appliances as well as for the improvement of reliability of automotive systems, sub-systems or components. Another application would be the control of machine tools, where the control would consist in a compromise between performance and maintenance intervals.

It will be appreciated, that the recorded parameters and the evaluated usage profile may further be used for determining preventive maintenance intervals based on actual system, sub-system or component use. Furthermore the recorded data from different systems, sub-systems or components of a device can be evaluated in order to determine a residual value of the device for the secondhand market.

According to the method at least one operation parameter of said system, sub-system or component is adjusted, if a difference between the evaluated usage profile and a nominal usage value at the time of the evaluation exceeds a predetermined threshold value. In other words, adaptation of the operation parameters is executed once the actually accumulated stress exceeds the nominal stress by a certain amount or if the difference between actual lifetime consumption and nominal lifetime consumption exceeds a specific threshold value.

The calculation on the difference between the evaluated usage profile and a nominal usage value can be done repeatedly and the operation parameters can be adjusted as soon as the threshold is exceeded. In another embodiment of the method, the evaluation of the actual usage profile and the conditional adjustment of the operational parameters may only be executed after a predetermined operation time of said system, sub-system or component. In a further variant, step c) is executed if said evaluated usage profile indicates that the accumulated stress exceeds a predetermined threshold value, i.e. after the lifetime consumption of the system, sub-system or component reaches a predetermined value.

In a preferred embodiment, the step of adjusting an operation parameter comprises the step of calculating updated actuation parameters for said systems, sub-systems or components based on the operation history contained in said usage profile. The calculation of the updated operation parameters may for instance take into account the actual accumulated stress and adjust the operational parameters in such a way that the overall target for service time will be met. The calculation is preferably based on the operation history, which means that the parameters are adjusted to meet the target at the previous operational conditions.

In the following, a few examples for the application of the present method will be given. In home appliances, as e.g. a washing machine, the rotational speed of the electrical motor in the spin gear may be slightly reduced when the usage profile indicates a premature wear of the motor.

In an automotive vehicle, switching thresholds of an automatic transmission may be adapted in order to reduce the number of gear shifting operations when the usage profile indicates that the frequency of such switching operations lies above a nominal frequency. Further examples of application in the automotive context include the control of systems, sub-systems or components of an air conditioning system, of electrically operated sliding roofs or side windows, the control of the intensity of instrument lightning in the dashboard, etc.

BRIEF DESCRIPTION OF THE DRAWINGS

The present invention will be more apparent from the following description of a not limiting application with reference to the attached FIG. 1. This FIGURE shows a graph of the number of operations of an actuator over operation time. The method will be explained in an application of controlling the operation of a ventilating flap of a vehicle air conditioning (AC) system.

DESCRIPTION OF THE PREFERRED EMBODIMENT

During the conception of the AC system, the actuator is designed for performing a predetermined number of switching operations. This predetermined number corresponds to the reliability limit and is referenced in FIG. 1 as 10. If this predetermined number of switching operations is uniformly spread over the service life of the AC system, the graph contains a linear curve, which is considered to be the target curve. This target curve is indicated in the attached FIGURE as 12. The target curve indicates the number of actuation operations under nominal operation conditions. These nominal conditions are calculated on the basis of a certain distribution between AC operation starting phases and longer phases of continuous operation.

It is clear that in the starting phase of AC operation, all the regulation systems, sub-systems or components will be subject to much more stress than in phases of continuous operation, where stable conditions are present in the cabin of the vehicle. Thus, if a vehicle is normally used for making short trips, i.e. if the AC system often operates in start conditions, the accumulated stress will exceed the nominal stress after a certain operation time, i.e. the actual lifetime consumption will deviate from the nominal lifetime consumption. This is illustrated in FIG. 1 by a dashed linear curve 14 having a slope, which is considerably steeper than that of the target curve 12. As can be seen, the dashed curve 14 crosses the reliability limit 10 before the target service life of 6000 hours will be reached (16). Thus, if the actuator will continuously be operated with the actual performance, the actuator will fail before the end its nominal service life.

This is where the present method sets in. According to the present method a usage profile of the actuator is calculated based on parameters which are relevant to component aging. If this usage profile indicates that the accumulated stress exceeds the nominal stress by a certain value, the operational parameters of the actuator are modified. The operational parameters are preferably modified so as to reduce the future stress of the component. This can e.g. in the present example be achieved by increasing an incremental adjustment of the flap position, thus reducing the number of steps necessary in order to move the flap between to end positions.

The modification preferably takes into account the operation history of the component and the remaining time until the end of the nominal service life. In this way, the reliability of the component may be assured until the end of the nominal service life. The resulting lifetime consumption curve comprises a first portion 18 having a steeper slope than the target curve 12 and a second portion 20 having a slope which is smaller than the one of the target curve 12. It will be noted that during the first part of the lifetime, i.e. when working according to curve 18, the component operates with its maximum performance. During the second part however, i.e. when working according to curve 20, the performance of the component will be slightly reduced in order to meet the reliability criteria.

The calculation of the updated operational parameters may set in once the usage profile indicates a specific amount of accumulated stress as shown in FIG. 1. This variant of modification of the operation parameters results in a kink of the life time consumption curve at the point of intersection between the actual lifetime consumption curve and a horizontal line indication the specific amount of stress. In an alternative embodiment, the update of the operational parameters may be executed after a specific operation time of the device. In this case, the kink in the lifetime consumption curve will occur at the corresponding point in time.

If desired, the adaptation of the operational parameters could be done continuously. Such a continuous operation will result in a smoother lifetime consumption curve.

What is claimed is:

1. Method for controlling the operation of a system, sub-system or component, comprising the steps of
    a) repeatedly recording an operation time of said system, sub-system or component and at least one further parameter of said system, sub-system or component, wherein the further parameter is indicative of stress in the system, sub-system or component and results in an accumulated stress effective to cause aging and reduce an operational lifetime of the system, sub-system or component;
    b) evaluating a usage profile based on said recorded operation tune and said at least one further parameter, said usage profile being indicative of the accumulated stress at the time of the evaluation, and
    c) if a difference between said evaluated usage profile and a nominal usage value at the time of the evaluation exceeds a predetermined threshold value, adjusting at least one operation parameter of said system, sub-system or component to reduce said stress in said system, sub-system or component.

2. Method according to claim 1, wherein said step c) is executed after a predetermined operation time of said system, sub-system or component.

3. Method according to claim 1, wherein said step c) is executed if said evaluated usage profile indicates that the accumulated stress exceeds a predetermined threshold value.

4. Method according to claim 1, wherein said step of adjusting an operation parameter comprises the step of calculating updated actuation parameters for said systems, sub-systems or components based on the operation history contained in said usage profile.

5. Method according to claim 1, wherein said step of adjusting an operation parameter comprises the step of reducing the performance of said system, sub-system or component.

6. Method according to claim 1, wherein said step of adjusting an operation parameter comprises the step of reducing the operation frequency or working time of said system, sub-system or component.

* * * * *